United States Patent [19]
Peck et al.

[11] Patent Number: 5,375,063
[45] Date of Patent: Dec. 20, 1994

[54] APPARATUS AND METHOD FOR VOICE CONTROLLED APPAREL MACHINE

[75] Inventors: John C. Peck, Seneca; Randy Rowland, Six Mile, both of S.C.

[73] Assignee: Clemson University, Clemson, S.C.

[21] Appl. No.: 155,100

[22] Filed: Nov. 19, 1993

Related U.S. Application Data

[63] Continuation of Ser. No. 763,347, Sep. 20, 1991, abandoned.

[51] Int. Cl.$^5$ .................. G06F 15/46; D05B 19/00; B65H 63/00
[52] U.S. Cl. .................. 364/470; 395/2.84; 112/277; 112/121.11
[58] Field of Search ........... 364/470; 112/277, 121.11; 395/2, 2.84; 381/42, 43

[56] References Cited
U.S. PATENT DOCUMENTS

| | | | |
|---|---|---|---|
| 4,469,038 | 9/1984 | Fujikawa | 112/277 |
| 4,862,363 | 8/1989 | Krisher et al. | 381/42 |
| 4,896,357 | 1/1990 | Hatano et al. | 381/43 |
| 4,922,538 | 5/1990 | Tchorzewski | 381/42 |
| 5,144,900 | 9/1992 | Takahashi | 314/410 |

OTHER PUBLICATIONS

Advertising material for intravoice by voice connection, pp. 1–16 1989.

Primary Examiner—Joseph Ruggiero
Assistant Examiner—Jim Trammell
Attorney, Agent, or Firm—Dority & Manning

[57] ABSTRACT

Apparatus and method for speech recognition control of apparel manufacture equipment, such as a sewing machine, is provided. This invention allows an operator to control specific operational modes of the apparel manufacture equipment through verbal commands recognized by the equipment as distinct from other sounds in the environment of the equipment. The invention includes a device for recognizing and translating an operator's verbal command into an electronic control signal; a communication device such as a microphone for inputting the operator's verbal command into the recognizing and translating device; and interfacing means for presenting the electronic control signal to the apparel manufacture equipment in a form recognized and accepted by the equipment. The method for voice control of apparel manufacture equipment according to the present invention comprises the steps of receiving an operator's verbal command through, for instance, a microphone; recognizing and translating the verbal command into an electronic control signal; and routing this electronic control signal to the apparel manufacture equipment in a form recognized by and actable upon by the equipment.

16 Claims, 2 Drawing Sheets

APPARATUS AND METHOD FOR VOICE CONTROLLED APPAREL MACHINE

This is a continuation of application U.S. Ser. No. 07/763,347 filed Sep. 20, 1991, which was abandoned upon the filing hereof.

BACKGROUND OF THE INVENTION

The present invention relates to apparel manufacture equipment.

Apparel manufacture equipment includes, but is not limited to, devices such as sewing machines, embroidering machines, cutting machines, and the like. In the present state of the art, these machines are generally controlled by operators physically commanding the machine to perform some desired task or function. For instance, with regards to industrial or assembly-line type sewing machines, an operator controls the operations of the sewing machine through a foot pedal. The operator physically commands the sewing machine to perform a function by pressing his foot upon the pedal in a certain manner causing contacts within the pedal to make and/or break. These contacts in turn cause the sewing machine to respond in some desired manner.

The operator may also physically control the machine by manually operating relays, trips, and like control devices. This type of manual or physical control, especially in the case of the sewing machine with associated foot control pedal, contributes to operator fatigue and other physical ailments. For instance, a common complaint among operators of the foot control sewing machine is recurring lower back pain and leg problems. These ailments can be attributed to the fact that the operator must essentially balance himself upon one foot while maintaining control of the machine with the other foot over extended periods of time. Additionally, the operator in many instances must maintain his foot on the control pedal at a certain angle or tilt and with a certain amount of pressure to maintain the machine operating in a certain mode. This is an ergonomically unsound working condition and, in time could lead to serious health problems for the operators and financial hardships for the employer in the way of sick leave, insurance and disability payments, and the like. The present invention addresses these problems and provides an apparatus and method to overcome them.

OBJECTS AND SUMMARY OF THE INVENTION

It is a principal object of the present invention to provide an apparatus wherein an operator controls specific operations of apparel manufacture equipment through verbal commands recognized by the equipment as distinct from other sounds in the environment and of the equipment.

A further object of the present invention is to provide an apparel manufacture system that recognizes and translates an operator's verbal command into an electronic control signal that is recognized by and actable upon by apparel manufacture equipment, such as a sewing machine.

It is also an object of the present invention to provide apparatus and method for speech recognition control of sewing machines.

Another object of the present invention is to provide an apparatus and method for voice control of any variety of apparel manufacture equipment machines such as an embroidering machine.

Yet a further object of the present invention is to provide apparatus and method whereby an operator can control the operation of apparel manufacture equipment without the use of hand or foot control devices.

A still further object of the present invention is to provide an ergonomically sound method and apparatus for controlling apparel manufacture equipment.

Still another object of the present invention is to provide a method and apparatus which allows a physically handicapped person to operate apparel manufacture equipment.

Still another object of this present invention is to provide an apparel manufacture system capable of discriminating speech patterns for a plurality of different operators and responding to one or more of the individual operators' specific speech patterns.

Yet another object of the present invention is to provide an apparel manufacture system capable of receiving a library of operator-specific verbal commands stored in an apparatus which can be downloaded into the apparel manufacture system prior to operating same.

It is also an object of the present invention to provide apparatus which can be retrofitted to existing apparel manufacture equipment to enable an operator to control specific operations of the apparel manufacture equipment through verbal commands recognized by the equipment as distinct from other sounds in the environment and of the equipment.

Still another object of the present invention is to provide apparatus for speech recognition control of apparel manufacture equipment capable of multi language/accent support.

And still another object of this invention is to provide an apparel manufacturing system capable of speech control from a portable personal sized battery powered speech recognition device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, apparatus for manufacturing apparel is provided wherein an operator controls specific operations of the apparatus through verbal commands recognized by the apparatus as distinct from other sounds in the environment of the apparatus. The apparatus of the present invention comprises means for performing an apparel manufacturing task; means for recognizing and translating a verbal command into an electronic control signal; means for inputting an operator's verbal command into the recognizing and translating means; and interfacing means for presenting an electronic control signal from the recognizing and translating means to the apparel manufacturing task means in a form recognized and accepted by the apparel manufacturing task means, the interfacing means being electrically connected in communication with the recognizing and translating means.

In one preferred embodiment of this invention, the interfacing means modifies the electronic control signal into a form recognized and actable upon by the apparel manufacturing task means. In this embodiment, the interfacing means may comprise a conventional relay box or station. In another preferred embodiment, the electronic control signal from the recognizing and translating means is already in a form recognized and accepted by the manufacturing task means. In this instance, the interfacing means routes the electronic control signal to the apparel manufacturing task means without modifying the signal.

The recognizing and translating means according to the present invention preferably comprises a speech recognition computer. This speech recognition computer in turn preferably comprises means for creating a library of operator specific electronic control signals correlating to a set of specific verbal commands of a particular operator; means for storing the library of operator specific control signals; and means for accessing the electronic control signal corresponding to the operator specific verbal command. In a most preferred embodiment of this invention, the speech recognition computer is relatively small and portable and can be worn by an operator, for instance, on his belt.

In another preferred embodiment of the present invention, the apparatus further comprises means for training the speech recognition computer to operate with a specific individual operator. Preferably, these training means comprise an external computer, such as a personal computer or hand-held computer, that is interfaceable with, i.e., connected to communicate electrically, the speech recognition computer. The external computer is configured to allow an operator to communicate with and cause the speech recognition computer to create a library of operator-specific electronic control signals.

The apparel manufacturing task means of the present invention can be of any type of apparel manufacturing or sewing equipment. For example, in a preferred embodiment of the invention, the apparel manufacturing task means comprises a sewing machine. In another preferred embodiment, the manufacturing task means comprises an embroidering machine. Likewise, the manufacturing task means may comprise a clutch-type or cycle-type motor sewing machine.

In yet another preferred embodiment of the present invention, the apparel manufacturing task means further comprises an electric motor configured to control specific operational modes of the manufacturing task means. The electric motor has control circuitry that is compatible with the interfacing means and configured to receive and act upon electronic control signals thereby directing the electric motor to perform a task according to an operator's verbal command. An example of this preferred embodiment would be a sewing machine with associated electric motor.

To further achieve the objects and in accordance with the purpose of the invention, as embodied and broadly described herein, the method for voice control of apparel manufacture equipment according to the present invention comprises the steps of receiving an operator's verbal command; recognizing and translating the verbal command into an electronic control signal; and routing the electronic control signal to the apparel manufacture equipment.

In one preferred embodiment of the method of this invention, the routing step further includes modifying the electronic control signal into a form recognized and actable upon by the apparel manufacture equipment.

Preferably, the recognizing and translating step further comprises the steps of inputting a verbal command to a speech recognition computer containing a library of operator specific electronic control signals correlating to an operator's verbal commands; searching the library of electronic control signals for a specific electronic control signal corresponding to the verbal command; and accessing and sending the specific electronic control signal to the apparel manufacturing task means.

In still another preferred embodiment of this invention, the method further comprises the step of training the speech recognition computer to operate with a particular operator. This training may comprise interfacing a personal computer with the speech recognition computer to initiate and conduct the training.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended Figs., in FIG. 1 is a perspective view of a schematic illustration of an embodiment of the apparatus of the present invention.

Figure 1:
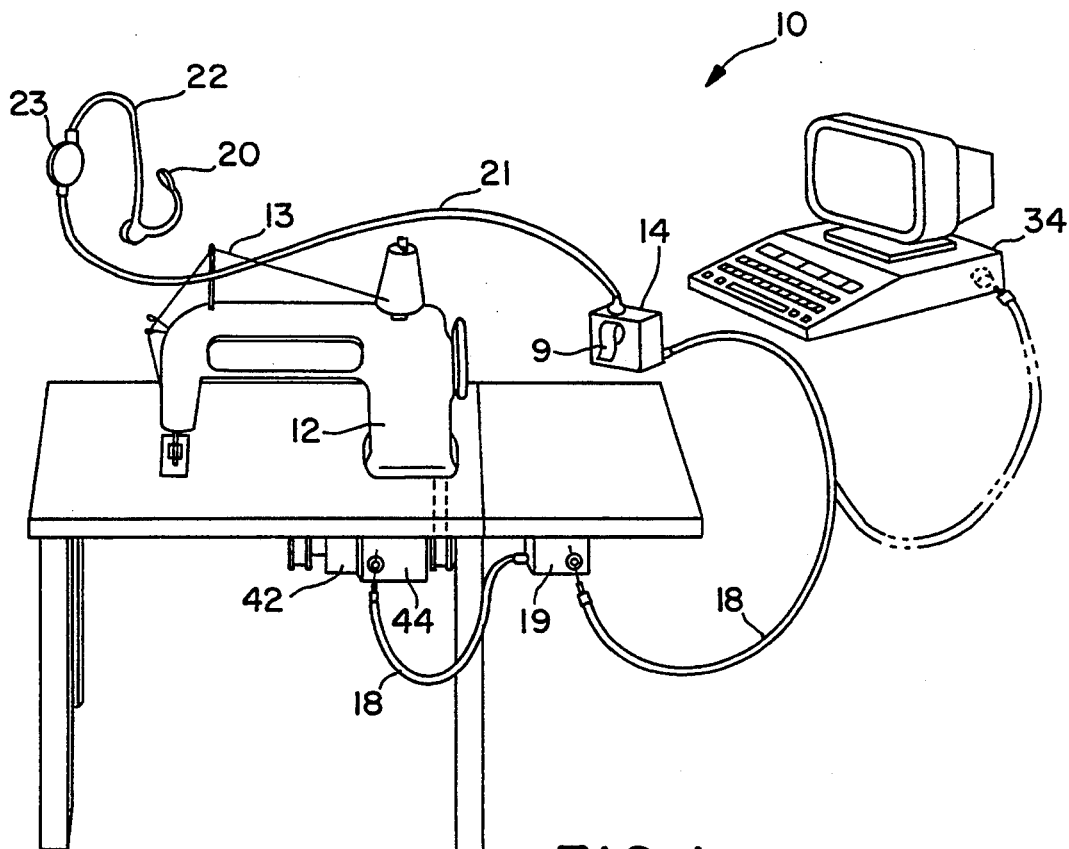

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

Figure 2:
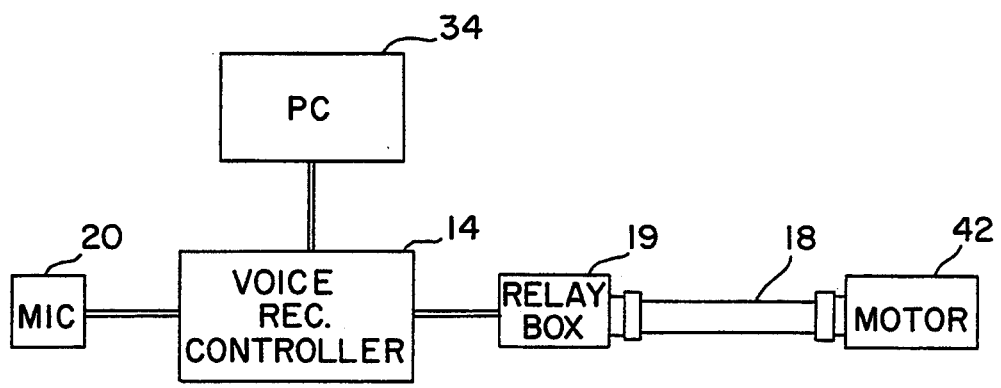
FIG. 2 is a schematic representation of the embodiment of the invention shown in FIG. 1.

A preferred embodiment of the present invention is shown in FIGS. 1 and 2 (schematically) and generally designated by the numeral 10.

In accordance with the present invention, means are provided for performing an apparel manufacturing task. As embodied herein, the apparel manufacturing task means can include an apparel manufacture device or equipment capable of carrying out a desired task in the manufacture of apparel. Such tasks can include sewing, cutting, stitching, folding, pressing, stretching, or the like. Moreover, the use of the term "apparel" is not meant as a limitation of any sort upon the invention.

The apparatus and method of this invention are not limited to clothing articles but include all products of the sewn products industry, for example curtains, seat covers, tents, sails, furniture upholstery and the like.

As embodied herein and shown in FIG. 1 for example, one embodiment of a means for performing an apparel manufacturing task can include a sewing machine 12 which can sew two pieces of fabric together or attach thread 13 to a sheet of material. Sewing machine 12 may be of the clutch-type motor sewing machine, the cycle-type motor sewing machine, or an embroidering machine, but is not limited to these machines. The apparatuses and methods of the present invention are particularly suited for the field of apparel manufacture equipment that requires the skill and physical/manual control of an operator. Examples of such equipment include sewing machines, embroidering machines, cutting machines, folding machines, pressing machines, stretching machines, and the like. The following description and appended drawings generally refer to the apparel manufacture equipment as a sewing machine 12, but this is for ease of illustration only and is not meant as a limitation. For example, the present invention could just as well be used for speech control of an embroidering machine or a cutting machine or a folding machine. Moreover, it is within the scope and spirit of the present invention to consider this apparatus and method in all applications of use where voice control of apparel manufacture equipment is desired.

In accordance with the present invention, means are provided for recognizing and translating an operator's verbal command into an electronic control signal. As embodied herein and shown for example in FIGS. 1–3, the recognizing and translating means preferably comprises a speech recognition computer 14. The speech recognition computer must be provided with means that converts sounds into electrical signals, which then can be received by computer 14 and converted into electronic control signals that computer 14 sends via one of its output ports. In a most preferred embodiment of the present invention as depicted in FIG. 1, speech recognition computer 14 is relatively small and portable, capable of being carried by an operator, for example on his belt with belt loop 9, to a work station employing apparatus 10.

In further accordance with the present invention, inputting means are provided for inputting or receiving sounds, such as the sounds comprising an operator's verbal command, into the recognizing and translating means. As embodied herein and shown in FIGS. 2 and 3 for example, such inputting means preferably comprises a microphone 20, which is electrically connected in communication with computer 14 via a cable 21. As shown in FIG. 1 for example, microphone 20 may be of the head-set type or throat type depending upon the operating environment of apparatus 10. For instance, a throat microphone may be more desirable in a noisy operating environment. Desirably, microphone 20 is provided with an electrical transducer which converts mechanical sound energy into electrical signals which constitute an electrical representation of the sounds of the voice commands. These electrical voice signals, so-called, are transmitted to computer 14 via cable 21. Desirably, when speech recognition computer 14 receives the electrical voice signals from microphone 20, computer 14 converts them into digitized electronic voice signals. For example, computer 14 may be provided with an analog-to-digital converter for this purpose.

In an alternative preferred embodiment of this invention, the inputting means may comprise an area receiver, for example an area microphone mounted to a wall, or a desk top microphone. Desirably, the inputting means should be sensitive enough to pick up the operator's verbal commands and be in communication with speech recognition computer 14.

Figure 3:
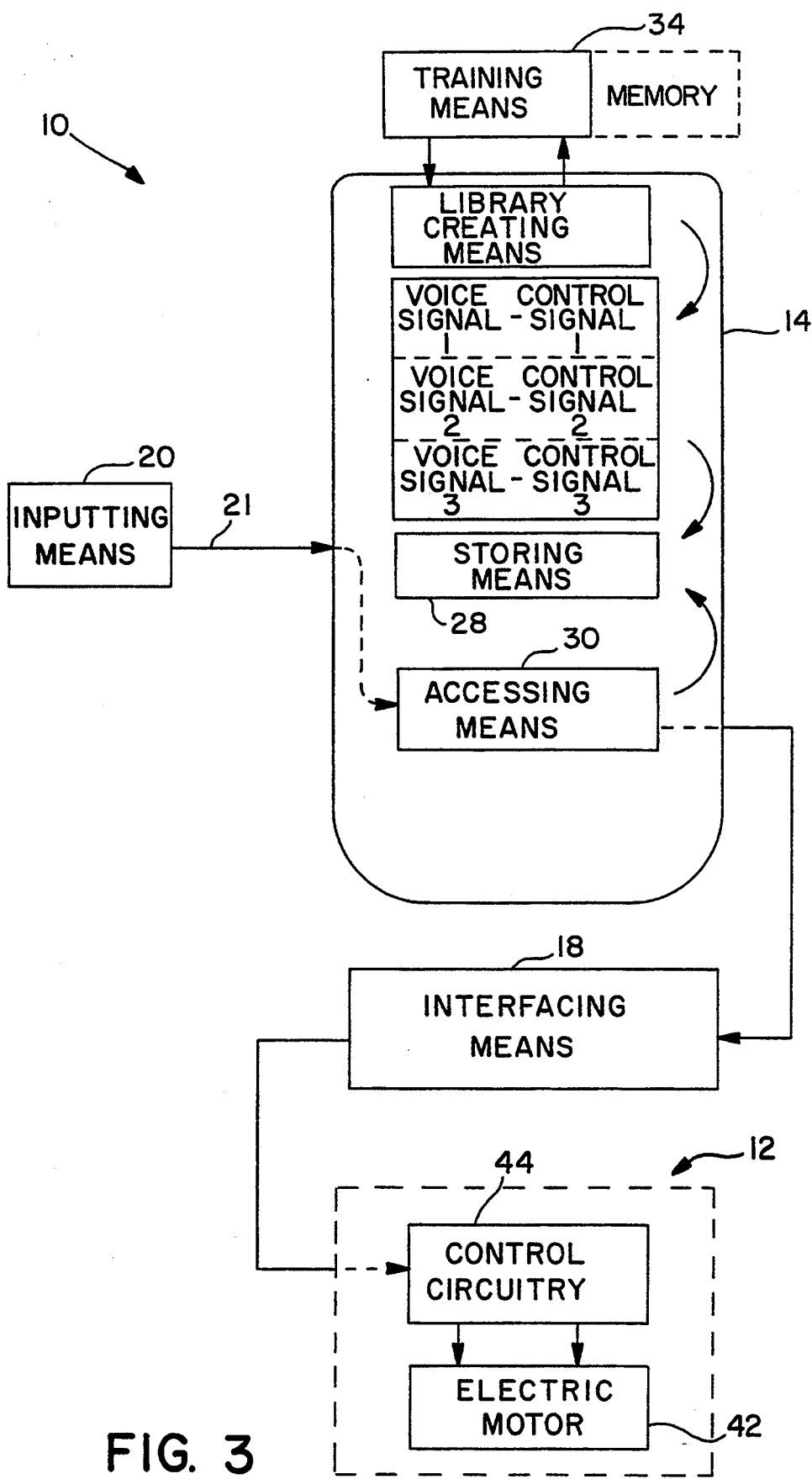
FIG. 3 is yet another schematic representation of the apparatus and method according to the present invention.

As embodied herein and schematically shown in FIG. 3 for example, speech recognition computer 14 preferably includes means for creating a library of operator-specific electronic control signals. In other words, in this library, a particular digitized electronic voice signal will be correlated to a particular digitized electronic control signal. In this way, as depicted in FIG. 3, an entire set of electronic control signals will be made specific to the voice commands of a particular operator or operators. Then, as explained below, upon receipt of the proper electronic voice signal, computer 14 sends the corresponding electronic control signal to an output port of computer 14. The library creating means allow an operator to create his own personal library of verbal commands which are recognized and accepted by speech recognition computer 14. Essentially, the library creating means allows an operator to input a verbal command into speech recognition computer 14 which in turn associates the verbal command with a digitized electronic control signal.

As embodied herein and schematically illustrated in FIG. 3 for example, speech recognition computer 14 further includes means for storing the library of operator-specific electronic control signals. In a preferred embodiment, the storing means consists of a memory device, such as a nonvolatile RAM, forming part of speech recognition computer 14. As schematically shown in FIG. 2 for example, these storing means allow the operator to download his library of commands from an external memory device such as a personal computer 34 to speech recognition computer 14.

In a most preferred embodiment, the storing means comprises a nonvolatile memory within speech recognition computer 14. This allows for speech recognition computer 14 to be relatively small and portable. This arrangement is also preferred because it eliminates the necessity of the operator having to download his verbal commands to speech recognition computer 14 prior to each use of apparatus 10. The library of commands would remain in the memory until another operator subsequently downloads his personal library to speech recognition computer 14.

In an alternative embodiment of this invention, speech recognition computer 14 can include a permanent type of memory (e.g., hard drive) system. In this alternative embodiment, the library of operator-specific control signals for all operators could be stored permanently within speech recognition computer 14. The operator could then simply access his personal library from the hard drive and transfer the library to the operating storing means.

As depicted schematically in FIG. 3 for example, speech recognition computer 14 further comprises means for accessing operator-specific electronic control signals from the library. The accessing means retrieve from an operator's stored library of electronic control signals, a particular control signal that corresponds to a specific verbal command inputted by the operator. The accessing means can include a preprogrammed microcomputer. This preprogrammed microcomputer gives speech recognition computer 14 the capabilities of recognition, vocabulary and voice pattern transfers, and word separability testing.

Referring to FIGS. 1 and 3, in operation, an operator inputs a verbal command into speech recognition computer 14 via microphone 20. Preferably, the operator is wearing speech recognition computer 14 on his person, for example hanging from his belt by belt loop 9. Computer 14 digitizes the electrical voice signal received from microphone 20. The accessing means 30 performs a comparison between the digitized electronic signal which represents the voice or speech pattern of the verbal command, and each of the digitized electronic signals which form the library in the storing means 28 of computer 14. If the comparison performed by the accessing means results in a match, this corresponds to the speech recognition computer recognizing the voice command. Upon recognizing the specific voice command, computer 14 then searches and retrieves from the library of stored commands the digitized electronic control signal corresponding to the verbal command and sends this control signal to an output port of computer 14. This latter operation corresponds to the final step of the speech recognition computer recognizing and translating a voice command into an electronic control signal.

Desirably, speech recognition computer 14 may also have the capability of voice synthesis. In that case, speech recognition computer 14 can include a voice synthesizer to communicate with the operator. This arrangement is desirable when the operator speaks a verbal command into microphone 20 but when the accessing means of speech recognition computer 14 carries out the comparison function, computer 14 is unable to find in the stored library an electronic control signal corresponding to the electronic voice signal of the operator's verbal command. Upon such occurrence, computer 14 is programmed to operate the voice synthesizer to communicate with the operator in a manner using the spoken word to inform the operator that the command spoken by the operator into microphone 20 was not recognized by computer 14. Then, the operator could reinput the voice command until it is recognized by computer 14.

Desirably, as shown in FIG. 1 for example, microphone 20 forms part of a headset 22. Headset 22 allows an operator to maintain his hands free and moves with the operator's head. Headset 22 desirably includes a receiver 23 which forms part of the earpiece of headset 22. The voice synthesizer of computer 14 can be connected via cable 21 and receiver 23 to be heard by the operator wearing headset 22.

An example of a commercially available system which may be employed as speech recognition computer 14 is the MICRO INTROVOICE ® by Voice Connexion. This system utilizes a NEC V-25 microcomputer operating at 8 megahertz. The system is a voice input/output system which provides speech recognition of 1,000 words with a published accuracy of better than 98%. The system includes system software for the control of recognition modes, training and updating, vocabulary and voice pattern transfers, speech recognition, and word separability testing. The MICRO INTROVOICE ® system is preferred for use in a factory environment because it can operate in noisy environments in excess of 85 db. In addition, there are a number of commercially available modular speech processing systems which may be used as speech recognition computer 14 in the present invention.

An example of the library creating means includes the Voice Utility Program (VUP) provided with the MICRO INTROVOICE ® system. This program provides for vocabulary creation, editing, user training, testing, and maintenance.

An example of the storing means includes the 128 Kb RAM memory in the MICRO INTROVOICE ® system.

An example of the accessing means is a microprocessor preprogrammed as the system software of the MICRO INTROVOICE ® system.

In a preferred embodiment of this invention, speech recognition computer 14 has the capability to process, store, and recognize word groups, not just single-word verbal commands. For example, the MICRO INTROVOICE ® system can isolate word groups into separate sub-libraries within a single master library and up to 15 independent sub-libraries can be accessed at any time. This arrangement is preferred because it provides far greater flexibility in composing the library of verbal commands.

The present invention is not limited to any particular language or even to any use of spoken words in general. For example, the operator need not speak English when "training" speech recognition computer 14 to associate a sound with an electronic control signal. In addition, any combination of sounds uttered by an operator can correspond to an electronic control signal. In other words, an operator need not speak the word "stop" to command the apparel manufacture equipment to cease operating. Speech recognition computer 14 can be trained by the operator so that any distinct verbal sound will correlate to a specific control signal. The operator may choose verbal commands such as numbers or colors to correspond to a specific control signal which causes the apparel manufacture equipment to stop for example. The operator need not use the word "stop" as the command. For example, if the operator has trained speech recognition computer 14 to correlate spoken numbers to a particular electronic control signal, then speech recognition computer 14 will only generate that control signal response to those particular spoken numbers matching the speech pattern of that particular operator.

In an alternative preferred embodiment of the present invention, speech recognition computer 14 is configured to be compatible with more than one operator while maintaining the capability of distinguishing between operators. Thus, apparatus 10 is not restricted to use with only one particular operator. Any operator can operate any apparel manufacture equipment by downloading his library of electronic control signals to the storing means of speech recognition computer 14. However, once a particular operator's library is downloaded to computer 14, then only that operator can operate the apparel manufacture equipment forming part of apparatus 10. Thus, apparatus 10 discriminates between operators while being compatible with any number of operators.

Speech recognition computer 14 also preferably maintains the capability to recognize words or commands in context. For instance, if an operator were using apparatus 10 in a factory environment and were to engage in a conversation, it would be undesirable to have computer 14 process every verbal word or sound that it picked up. The operator could place apparatus 10 in a standby or passive mode by inputting a verbal command, for example, the word "relax." Speech recognition computer 14 can be "trained" to put itself into a passive mode upon receiving a certain verbal command. This assumes that computer 14 had been programmed to convert the word "relax" to a control signal that puts apparatus 10 in a passive mode of operation. Apparatus 10 would remain in that passive mode until receipt of another command, for example the spoken word "attention," which would have been preprogrammed to cause computer 14 to assume the active mode of operation. Thus, instead of sending an electronic control signal to an output port upon receiving a particular voice command corresponding to the command to assume the passive mode, computer 14 would send itself a signal to suspend the accessing means from sending further control signals to the output port. It would then listen for another particular verbal command that would place it back into its active mode of sending its control signals to its output port. For example, the control program in the microprocessor NEC V-25 microcomputer in the MICRO INTROVOICE ® system has such a capability.

In accordance with the present invention, interfacing means are provided for presenting, or routing, the electronic control signal to the means for performing an apparel manufacturing task in a form recognized and accepted by the apparel manufacturing task means. Desirably, the interfacing means is electrically connected in communication with the recognizing and translating means. In one preferred embodiment of this invention shown in FIGS. 1 and 2 for example, the interfacing means can include an electrical cable 18, which routes the electronic control signal from an output port of speech recognition computer 14 to sewing machine 12 or another apparel manufacture equipment. In this embodiment, the control signal generated by speech recognition computer 14 already exists in a form recognized by and actable upon by sewing machine 12, the apparel manufacture equipment.

In another preferred embodiment of the invention shown schematically in FIGS. 1 and 2 for example, the interfacing means may comprise a relay box or station 19 in addition to cable 18. Relay box 19 is configured to modify the electronic control signal into a form recognized by and actable upon by the particular apparel manufacture equipment forming part of apparatus 10 of the present invention. For example, in the embodiment of the invention depicted in FIGS. 1 and 2, speech recognition computer 14 may, for example, employ a RS-232 serial interface, as is used in the MICRO INTROVOICE system. Sewing machine 12 may not be capable of being actuated or controlled by RS-232 signals in serial form, hence relay station 19 is provided to modify the control signal into an appropriate collection of relay closures.

A conventional relay station can be used as relay box 19. Relay box 19 may, for example, include a relay station comprising a solid state logic circuit for converting a parallel TTL signal into appropriate relay signals.

In one preferred embodiment of this invention, a means can be provided for training speech recognition computer to operate with a specific individual operator. The training means essentially comprises a temporary communication interface between the operator and the speech recognition computer, and allows the operator to train the computer to create the library of electronic control signals specific to that operator.

In a preferred embodiment of this invention, as shown in FIGS. 1 and 2, the training means may comprise an external computer 34, which can be in the form of a personal computer or hand-held computer (not shown). When a new operator desires to use apparatus 10 to control apparel manufacture equipment, he must train speech recognition computer 14 to recognize his speech pattern and create the library of command signals particular to that operator. External computer 34 allows the operator to communicate with speech recognition computer 14 to accomplish this task. In the disclosed embodiment, this is accomplished by the Voice Editor program of the MICRO INTROVOICE ® system. The operator creates and edits a vocabulary or library of command words and control signals on the personal computer for later downloading to speech recognition computer 14. This library can be stored internal to external computer 34, in an installed hard drive for example as depicted in FIG. 3, or upon a memory device such as a floppy disk or computer card. In this arrangement, the training means, specifically external computer 34, further acts as a storage device for the command words and control signals. The operator interfaces speech recognition computer 14 with external computer 34 to create the electronic control signals correlating to his verbal command signals. The signals are then stored in external computer 34 until that operator is ready to use apparatus 10. At that point, the operator again interfaces computer 34 with speech recognition computer 14 to download the library of electronic control signals to the storing means of speech recognition computer 14. Once that operation is complete, external computer 34 is no longer necessary and may be disconnected from speech recognition computer 14.

In another alternative embodiment of the invention, the training means may also be used to set certain operating parameters, such as gain control, of speech recognition computer 14.

As noted above, the operator need not create the library of electronic control signals every time he desires to use apparatus 10. The library of control signals can be stored in an outside or external memory device, for example the hard drive of external computer 34. In that case, the operator need only download the library to the memory in speech recognition computer 14, for example a nonvolatile RAM. With this embodiment, speech recognition computer 14 would not have its own "permanent" type memory (e.g., a hard drive) but, weight, power, and size considerations would be maximized allowing for a smaller portable speech recognition computer 14.

In an alternative embodiment of the present invention, speech recognition computer 14 comprises its own permanent storage memory device, such as a hard drive. In this instance, the operator need only retrieve his personal library from the hard drive and place it in the operating storing means of speech recognition computer 14. In this embodiment, speech recognition computer 14 may also include the capability of interfacing with and communicating directly with the operator to create the library of electronic control signals. In other words, the external training means, specifically external computer 34, would not be needed.

In one preferred embodiment of an apparatus 10 according to the present invention and shown for example in FIGS. 1-3, the apparel manufacture equipment, such as sewing machine 12 for example, further comprises an electric motor 42. Electric motor 42 is configured to control specific operational modes of sewing machine 12. For instance, electric motor 42 may control the speed of sewing machine 12 and other various functions performed by sewing machine 12.

Electric motor 42 further comprises control circuitry 44 that is compatible with the interfacing means and configured to receive and act upon the electronic control signals from speech recognition computer 14, thereby directing electric motor 42 to perform a task according to an operator's verbal command. In a most common example of the present state of the art of apparel manufacture devices, an operator controls the device by imparting signals via a foot pedal or similar device to control circuitry of an electric motor. The signals from the foot pedal cause contacts in the electric motor control circuitry to make or break depending upon the actual signal received. The control circuitry in turn controls the operation of the electric motor and causes the machine to operate accordingly.

The operation and method of the present invention will now be explained. Referring in detail to the embodiment of FIG. 1, external computer 34, a personal computer, is provided whereby the operator initially trains speech recognition computer 14 to create a library of electronic control signals particular to that individual operator. The operator interfaces speech recognition computer 14 with external computer 34 and downloads his library of electronic control signals, which are stored in external computer 34, to the storing means of speech recognition computer 14. This operation must be completed before apparatus 10 will respond to the operator's voice commands. Still referring to FIG. 1, an operator wearing headset 22 inputs, as by speaking, a verbal command into microphone 20. The microphone sends an electrical signal representing this verbal command via cable 21 to speech recognition computer 14. Computer 14 converts this electrical signal into a digitized electronic signal representing this verbal command. The accessing means of computer 14 compares the digitized electronic signal representing this verbal command to the operator-specific electronic control signals stored in its library of electronic control signals. If the comparison results in a match, speech recognition computer 14 recognizes and accepts the speech pattern of the operator. Speech recognition computer 14 then accesses that particular electronic control signal and sends it to its output port. The signal is transmitted from the output port through an interfacing means, in this case cable 18, to an apparel manufacture equipment, in this case sewing machine 12. If necessary, the interfacing means can further include relay box 19 to modify the control signal from speech recognition computer 14 into a form accepted by and actable upon by sewing machine 12. The control signal is routed via the interfacing means to control circuitry 44 of electric motor 42. Control circuitry 44 responds to the electronic control signal by directing electric motor 42 to change its operational state and thereby causing sewing machine 12 to perform a desired function.

The present invention provides an apparatus and method whereby an operator can control various functions of the apparel manufacture equipment by simply speaking a verbal command into the apparatus of the present invention, which translates the verbal command into an electronic control signal and passes this signal to the apparel manufacture equipment in a form that is recognized by the equipment. The equipment then responds to this signal and performs the desired task. The voice control apparatus of this invention interfaces between the operator and the equipment without imposing any physical restraints or requirements upon the operator as a prerequisite to being able to operate and control the equipment. The operator is free to assume any stance or posture with which he is comfortable. Providing for this degree of physical mobility will prove extremely beneficial to both the operators and their employers.

Additionally, the present invention also allows one operator to control the operation of more than one type of machine. Presently, the general rule is that one operator works with one type of machine only since, as discussed above, that operator must be trained to physically or manually control the operation of the machine. The present invention provides means for an operator to communicate with any number of machines by simply inputting a voice command to those machines. Thus, it is feasible that far fewer employees will be needed to operate and control a far greater number of machines.

Also, the present invention requires very little in the way of physical skill, coordination, or aptitude from an operator. For example, a physically disabled person (for instance a wheelchair-bound person) could be employed to operate a voice controlled apparel manufacture device according to this invention, whereas previously such a person would be unable to function at this position. As long as a person could visually observe the operation of the machine and be able to speak verbal commands to control the machine, such a person would be a productive employee.

Also, the voice control method of this invention may reduce the amount of training needed by employees. A new employee could be trained in a relatively short time period. The employee need only learn the proper verbal commands and how to train the machine to accept his commands.

The present invention addresses the ergonomic related physical problems caused by the conventional apparel manufacture control methods and also provides apparatus and method allowing a far less skilled employee (both mentally and physically) to contribute as productive employees in this industry.

What is claimed is:

1. A speech recognition controlled sewing device, wherein an operator controls specific operations performable by said sewing device through verbal commands recognized by said sewing device as distinct from other sounds in the environment of said sewing device, comprising:

a sewing machine capable of performing a desired sewing task;

an electric motor powering the operation of said sewing machine;

digital electric motor control circuitry connected to said electric motor for controlling the operation of said electric motor through received digital signals;

a speech recognition computer for recognizing and translating a verbal command into an electronic control signal actable upon by said electric motor control circuitry, said speech recognition computer further comprising:

means for creating a library of operator-specific electronic control signals correlating to a set of specific verbal commands of a particular operator;

means for storing the library of operator-specific electronic control signals; and means for comparing an operator's verbal command to said library and for accessing the electronic control signal corresponding to the operator's specific verbal command;

a microphone for inputting an operator's verbal command into said speech recognition computer; and interfacing means for translating the electronic control signal into a digital control signal recognized by said electric motor control circuitry, said interfacing means in communication with said speed recognition computer and said electric motor control circuitry, said speech recognition computer being non-dependent on feedback signals indicating the actual operating condition of said sewing machine.

2. A method for voice control of apparel manufacture equipment, said method comprising the steps of:

creating and storing a library of operator specific digitized control signals;

receiving an operator's verbal command;

translating the verbal command into a digitized verbal command;

comparing the digitized verbal command to the library of operator specific digitized control signals;

retrieving the digitized control signal matching the digitized verbal command;

translating the digitized control signal with a portable interface device into a digital signal which is recognized and actable upon by control circuitry of the apparel manufacture equipment; and routing the translated digital signal to the control circuitry of the apparel manufacture equipment to be acted upon thereby, wherein said method does not depend on receiving signals or external input indicating the actual operating status of the apparel manufacture equipment.

3. A method as in claim 2, wherein said receiving step includes inputting the verbal command into a head set microphone.

4. A method as in claim 2, wherein said routing step includes routing the electronic control signal to a sewing machine.

5. A method as in claim 2, wherein said routing step includes routing the electronic control signal to an electric motor sewing machine.

6. A method as in claim 2, wherein said routing step includes routing the electronic control signal to a cycle-type sewing machine.

7. The method as in claim 2, wherein said creating and storing the library further comprises creating and storing a plurality of different operator specific control signals wherein a particular operator must first access his particular library of control signals, said method thereby being able to discriminate between and operate with different operators.

8. Control apparatus for operating manufacturing apparel machines having electronic control circuitry for controlling specific operations of the machine wherein an operator controls specific operations of the machines through verbal commands recognized by the control apparatus as distinct from other sounds in the environment of the apparel machine, said control apparatus comprising:

a receiver for receiving an operator's verbal command;

means for converting said verbal command into an electronic voice signal;

means for digitizing said electronic voice signal;

means for comparing said digitized electronic voice signal to a library of stored operator specific digitized control signals and for retrieving the digitized control signal matching said digitized voice signal whereby only a particular operator whose digitized voice signal matches said stored digitized control signals can operate said apparel manufacturing machine;

an electronic interface device operably disposed between said machine control circuitry and said comparing and retrieving means, said interface device translating the digitized control signals in digital signals recognized by the apparel machine electronic control circuitry for controlling operation of said manufacturing machine; and wherein said control apparatus is portable and said electronic interface is matable with a variety of apparel manufacturing machines, said comparing and retrieving means being non-dependent on actual operating conditions of said manufacturing machine.

9. Apparatus as in claim 8, wherein said receiver comprises a head set microphone and said converting means, said digitizing means, and said comparing and retrieving means are contained in a portable unit capable of being worn by an operator.

10. Apparatus as in claim 9, wherein said portable unit comprises a speech recognition computer.

11. Apparatus as in claim 10, further comprising means for interfacing with said speech recognition computer to create said stored library of operator specific digitized control signals, and a storage medium for storing said library.

12. Apparatus as in claim 11, wherein said speech recognition computer is configured to store a plurality of said libraries of operator specific digitized control signals so that more than one operator can use said apparatus.

13. Apparatus as in claim 11, wherein said interfacing means comprises an external computer interfaceable with said speech recognition computer, said external computer configured to allow the operator to communicate with and train said speech recognition computer to create said library of operator specific digitized control signals.

14. Apparatus as in claim 8, wherein said apparel manufacturing machine comprises a sewing machine.

15. Apparatus as in claim 8, wherein said apparel manufacturing machine comprises an embroidering machine.

16. Apparatus as in claim 8, wherein said apparel manufacturing machine comprises a cycle-type motor sewing machine.

* * * * *